US010216415B2

(12) United States Patent
Garcia et al.

(10) Patent No.: US 10,216,415 B2
(45) Date of Patent: Feb. 26, 2019

(54) COMPUTER PROGRAM PRODUCT, SYSTEM, AND METHOD FOR DYNAMICALLY INCREASING THE CAPACITY OF A STORAGE DEVICE

(71) Applicant: INTEL CORPORATION, Santa Clara, CA (US)

(72) Inventors: Rowel S. Garcia, Hillsboro, OR (US); Sanjeev N. Trika, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 260 days.

(21) Appl. No.: 15/158,536

(22) Filed: May 18, 2016

(65) Prior Publication Data

US 2017/0336981 A1 Nov. 23, 2017

(51) Int. Cl.
*G06F 12/00* (2006.01)
*G06F 3/06* (2006.01)
*G06F 12/02* (2006.01)

(52) U.S. Cl.
CPC ............ *G06F 3/0605* (2013.01); *G06F 3/064* (2013.01); *G06F 3/0608* (2013.01); *G06F 3/0659* (2013.01); *G06F 3/0661* (2013.01); *G06F 3/0665* (2013.01); *G06F 3/0679* (2013.01); *G06F 12/0246* (2013.01); *G06F 2212/1044* (2013.01); *G06F 2212/152* (2013.01);

(Continued)

(58) Field of Classification Search
CPC ...... G06F 3/0605; G06F 3/0608; G06F 3/064; G06F 3/0659; G06F 3/0661; G06F 3/0665; G06F 3/0679; G06F 12/0246; G06F 2212/1044; G06F 2212/152; G06F 2212/214; G06F 2212/657; G06F 2212/7201; G06F 2212/7204; G06F 2212/401

See application file for complete search history.

(56) References Cited

U.S. PATENT DOCUMENTS 5,652,865 A 7/1997 Rawlings, III
5,774,715 A 6/1998 Madany et al.
(Continued)

OTHER PUBLICATIONS

International Search Report and Written Opinion for International Application No. PCT/US2017/028202, dated Jul. 27, 2017, 13 pp. [77.345PCT (ISR & WO)].

(Continued)

*Primary Examiner* — Matthew Bradley
(74) *Attorney, Agent, or Firm* — Konrad Raynes Davda & Victor LLP; David W. Victor

(57) ABSTRACT

Provided are a computer program product, system, and method for dynamically increasing capacity of a storage device. For address mappings, each addressing mapping indicates a storage device block address for a host block address and a compressed block size indicating a number of blocks storing compressed data for data written to the host block address starting at the storage device block address. Write data for a write request to a host block address is compressed to produce compressed data. A block size of the compressed data is less than request block size of the write data for the write request. Indication is made in the address mapping for the host block address of a storage device address at which to start storing the compressed data in the storage device and the compressed block size. The compressed data is sent to the storage device to write at the storage device block address.

25 Claims, 10 Drawing Sheets

(52) U.S. Cl.
CPC .. *G06F 2212/214* (2013.01); *G06F 2212/401* (2013.01); *G06F 2212/657* (2013.01); *G06F 2212/7201* (2013.01); *G06F 2212/7204* (2013.01)

(56) References Cited

U.S. PATENT DOCUMENTS

| | | |
|---|---|---|
| 7,146,455 B2 | 12/2006 | Cheng |
| 8,180,953 B2 | 5/2012 | Chu |
| 8,984,247 B1 | 3/2015 | Lo et al. |

OTHER PUBLICATIONS

U.S. Appl. No. 14/572,689, entitled "Apparatus, System and Method for Caching Compressed Data", filed Dec. 16, 2014, by S.N. Trika et al.
U.S. Appl. No. 14/751,450, entitled "Efficient Solid State Drive Data Compression Scheme and Layout", filed Jun. 26, 2015, by J.B. Khan et al.
U.S. Appl. No. 14/843,581, entitled "Technologies for Managing a Reserved High-Performance Memory Region of a Solid State Drive", filed Sep. 2, 2015, by S.N. Trika et al.
International Preliminary Report on Patentability for International Application No. PCT/US2017/028202, dated Nov. 29, 2018, 10 pp.

Address Mapping

| I/O Request Number | Host LBA | SSD LBA | Compressed size |
|---|---|---|---|
| 0 | 0 | 0 | 3 |
| 1 | 8 | 79 | 7 |
| 2 | 16 | 27 | 3 |
| 3 | 24 | 92 | 4 |
| 4 | 32 | 17 | 6 |
| 5 | 40 | 46 | 1 |
| 6 | 48 | 86 | 2 |
| 7 | 56 | 30 | 3 |
| 8 | 64 | 33 | 2 |
| 9 | 72 | 76 | 3 |
| 10 | 80 | 37 | 8 |
| 11 | 88 | 45 | 1 |
| 12 | 96 | 57 | 7 |
| 13 | 104 | 5 | 8 |
| 14 | 112 | 52 | 5 |
| 15 | 120 | 47 | 5 |
| 16 | 128 | 35 | 2 |
| 17 | 136 | 88 | 4 |
| 18 | 144 | 23 | 4 |

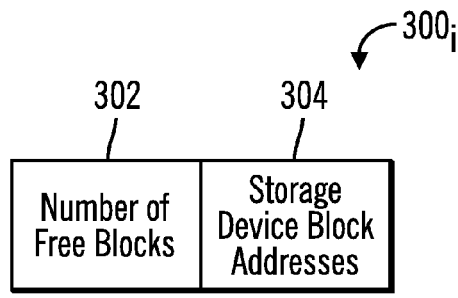
Free Space List Entry
FIG. 3A
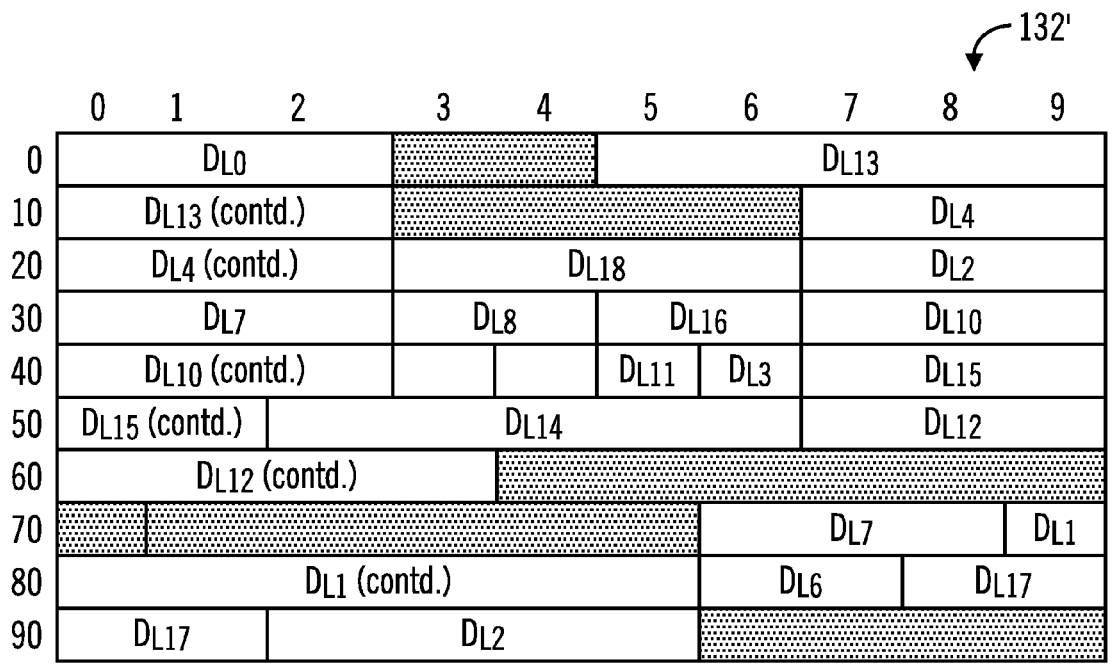
FIG. 3B
FIG. 3C

COMPUTER PROGRAM PRODUCT, SYSTEM, AND METHOD FOR DYNAMICALLY INCREASING THE CAPACITY OF A STORAGE DEVICE

TECHNICAL FIELD

Embodiments described herein generally relate to a computer program product, system, and method for dynamically increasing the capacity of a storage device.

BACKGROUND

Data compression is an often requested feature for storage devices to allow a greater amount of data to be stored in a storage device, such as a hard disk drive, solid state drive (SSD), etc. Certain SSDs include an embedded hardware compression module to compress data written to and decompress data read from the SSD. Including such additional compression hardware in the SSD increases the unit cost. Compression can also be delivered to a storage device by compressing data in a host operating system, such as Microsoft® Windows®. (Microsoft and Windows are registered trademarks of Microsoft Corporation throughout the world).

There is a need in the art for improved techniques for dynamically increasing the capacity of a storage device.

BRIEF DESCRIPTION OF THE DRAWINGS

Embodiments are described by way of example, with reference to the accompanying drawings, which are not drawn to scale, in which like reference numerals refer to similar elements.

FIGS. 3a and 3b illustrate an embodiment of a free space list entry.

FIG. 3c illustrates an example of a layout of a storage media implementing the layout described in the address mapping in FIG. 2b and the free space list in FIG. 3b.

DESCRIPTION OF EMBODIMENTS

Figure 1:
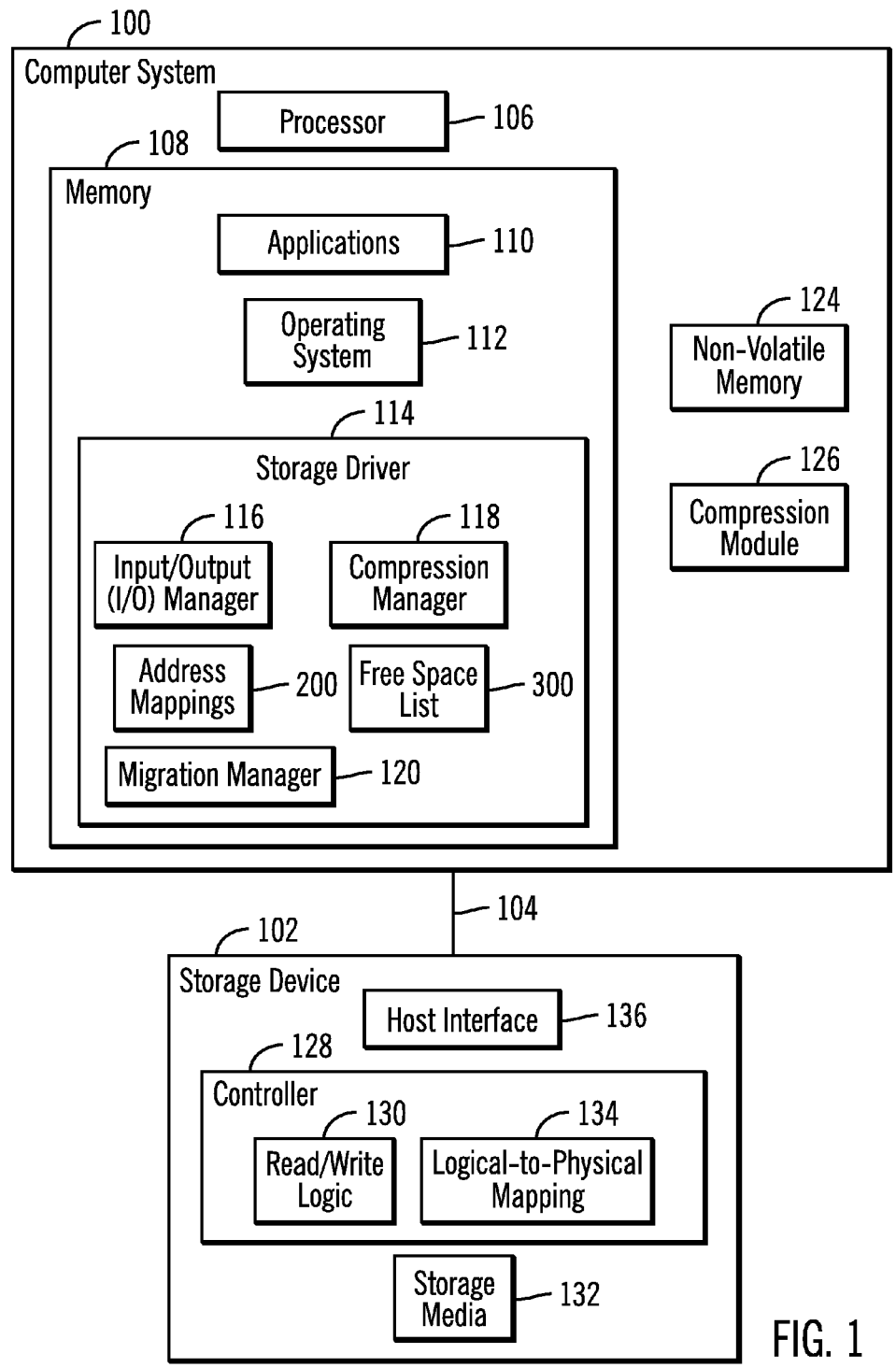
FIG. 1 illustrates an embodiment of a computing environment with a computer system and storage device.

Described embodiments provide techniques to dynamically increase the capacity of a storage device by performing compression and decompression operations in a computer system coupled to the storage device. Described embodiments have the computer system maintain address mappings, each indicating a storage device block address for a host block address and a compressed block size indicating a number of blocks storing compressed data for data written to the host block address starting at the storage device block address. Write data for a write request to a host block address is compressed. The address mapping for the host block address in the write request is updated to indicate a storage device address at which the compressed data is stored in the storage device and a block size of the compressed data as the compressed block size. The compressed data is sent to the storage device to write at the storage device block address.

Described embodiments reduce the cost of production over solutions that include compression hardware in the storage device by providing the compression in the computer system connected to the storage device to avoid the cost of having to include compression hardware within the storage device. Further, by implementing compression in the computer system, the described embodiments can support larger compression ratios than realized by compression implemented in the storage device.

Yet further, described embodiments provide improvements over solutions providing compression in the operating system by implementing compression in a compression module or codec separate from the operating system that provides higher compression ratios than operating system implemented compression.

Described embodiments also maintain the address mapping and any free space lists used by the storage driver to manage Input/Output (I/O) requests to the storage device in a persistent memory in the computer system so that the address mapping and free space list may remain available following a power cycle event at the computer system. Yet further, the address mapping and a free space list may be written to the storage device when the storage device is migrated to a destination computer system, and then loaded into the memory of the destination computer system for use by a storage driver installed on the destination computer system for read and write requests to the storage device.

In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Certain embodiments relate to storage devices electronic assemblies. Embodiments include both devices and methods for forming electronic assemblies.

FIG. 1 illustrates an embodiment of a computing environment including a computer system 100 connected to a storage device 102 over a connection 104. The computer system 100 includes a processor 106, such as one or more central processing units (CPUs), a memory 108, such as a volatile memory device, e.g., Random Access Memory (RAM), including an operating system 112, whose code is executed by the processor 106. The processor 106 may execute applications 110 that send I/O requests to the operating system 112, which interfaces with a storage driver 114 to send application I/O requests to the storage device 102. Additionally, the operating system 112 may receive I/O requests from connected computer systems and devices. The storage driver 114 includes an Input/Output (I/O) manager 116 to manage I/O requests from the host operating system 112 to the storage device 102; a compression manager 118 to manage compression/decompression operations: address mappings 200 mapping host block addresses, such as host logical block addresses (LBAs), to storage device block addresses, such as storage device logical block addresses (LBAs); a free space list 300 indicating storage device block addresses that are free or available for use; and a migration manager 120 to manage the transfer of the storage device 102 from one computer system to a destination computer system on which the storage driver 114 is installed.

The computer system 100 may include a non-volatile memory 124 to provide persistent storage and a compression module 126 to compress data before writing to the storage device 102 and decompress when reading data from the storage device 102.

The compression module 126 may be implemented in a chipset on the computer system 100 motherboard or on an expansion card. In alternative embodiments, the functions of the compression module 126 may be implemented in software in the storage driver 114 or operating system 112. The compression module 126 may implement any suitable compression algorithm for compressing data to be stored in a storage device, such as DEFLATE compatible compression routine, compression provided with the Intel® Intelligent Storage Library (ISA-L), etc. (Intel is a registered trademark of Intel Corporation throughout the world). Alternatively, the compression module 126 may be implemented in a chipset, such as the Intel® Communications Chipset 8925 to 8955 Series (codenamed Coleto Creek).

The non-volatile memory 124 may comprise NAND dies of flash memory cells, such as a multilevel cell (MLC) NAND flash memory where each cell records two bit values, a lower bit value and an upper bit value, single level cell (SLC) memories, three bit per cell (TLC) memories, etc., ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, other electrically erasable programmable read only memory (EEPROM) type devices, Non-Volatile Dual In-line Memory Module (NVDIMM) or any other type of memory or storage device that provides persistent storage external to the main system memory 108. In certain embodiments, the main system memory 108 is implemented in a separate physical device, such as a separate integrated circuit device, from the non-volatile memory 124.

The storage device 102 includes a controller 128 to perform read, write and error recovery (also known as read retry) operations with respect to a storage media 132. The controller 128 implements read/write logic 130 to perform read and write operations with respect to the storage media 132 and a logical-to-physical ("L2P") mapping 134 used by the read/write logic 130 to map I/O requests to a storage device logical address to a storage device physical address. The storage device 102 further includes a host interface 136 to connect to a computer system 100 over the connection 104, wherein the host interface 136 may implement Serial ATA (SATA), a Peripheral Component Interconnect (PCI) interface, Universal Serial Bus (USB), etc., depending on the connection type to the computer system 100.

The storage device 102 may comprise electrically erasable and non-volatile memory cells, such as flash storage devices. For instance, the storage media 132 may comprise NAND dies of flash memory cells. In one embodiment, the NAND dies may comprise a multilevel cell (MLC) NAND flash memory that in each cell records two bit values, a lower bit value and an upper bit value. Alternatively, the NAND dies may comprise single level cell (SLC) memories or three bit per cell (TLC) memories. The storage media 132 may also comprise, but not limited to, ferroelectric random-access memory (FeTRAM), nanowire-based non-volatile memory, three-dimensional (3D) crosspoint memory such as phase change memory (PCM), memory that incorporates memristor technology, Magnetoresistive random-access memory (MRAM), Spin Transfer Torque (STT)-MRAM, a single level cell (SLC) Flash memory and other electrically erasable programmable read only memory (EEPROM) type devices. The storage device 102 may also comprise a magnetic storage media, such as a hard disk drive or tape drive and tape media, etc. The storage device 102 may additional comprise a plurality of storage devices organized in a storage array, such as Redundant Array of Independent Disks (RAID) array, Just a Bunch of Disks (JBOD), etc.

The storage driver 114 may comprise a Non-Volatile Memory Express (NVMe) type driver for accessing non-volatile storage media attached via Peripheral Component Interconnect (PCI) Express (PCIe) bus 104. (The NVMe standard is described at http://www.nvmexpress.org). Alternatively, the storage driver 114 may implement storage protocols other than NVMe.

Figures 2A, 2B:
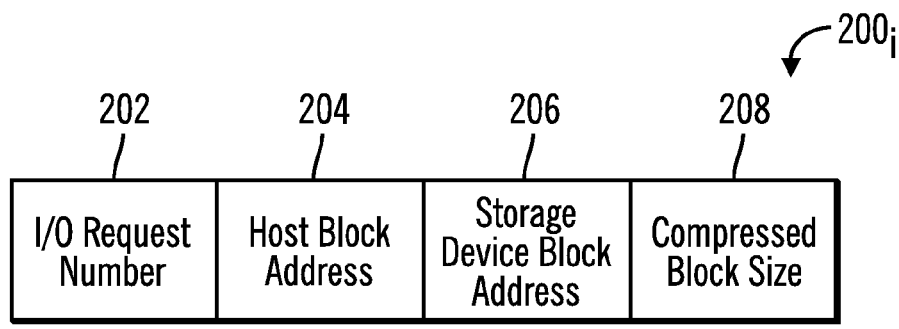
FIGS. 2a and 2b illustrate embodiments of an address mapping.

FIG. 2a illustrates an embodiment of an address mapping $200_i$ in the address mappings 200 including an I/O request number 202, where an I/O request is directed to a group of n consecutive host block addresses, such that there is an address mapping $200_i$ for every n host block addresses, or one entry for every I/O request that may be submitted; a host block address 204, which may comprise a host logical block address (LBA), identifying the first host block address 204 of the I/O request; a corresponding storage device block address 206, such as a storage device block LBA, to which the host logical block address 204 maps; and a compressed block size 208 indicating a number of blocks of the compressed data. In one embodiment, each host and storage device block address may be 512 bytes and an I/O request may have a block size of 4 Kilo Bytes (KB), or use eight 512 byte host and SSD block addresses. Other block sizes may be used for the host and device block addresses and for the I/O request size.

In an alternative embodiments, each address mapping $200_i$ may not explicitly include the host block address 204, and instead the host block address for the address mapping $200_i$ may be inferred from the I/O request number 202 or address mapping position in the address mappings 200, as n times the I/O request number 202, where n is the I/O request block size, e.g., 8 blocks.

FIG. 2b provides an example of an address mapping 200', with the first column including the I/O request number 202' and second column a host LBA 204' comprising a first host LBA of eight host LBAs for the corresponding I/O request number 202' when the I/O request size comprises a block of 8 host LBAs. In this way, the host LBA 204' of each I/O request number 202' is a multiple of eight as the Host LBAs between each eighth host LBA are part of the I/O request. The storage device block address 206' results from operations that modify where the data for the I/O request numbers 202' are stored in the storage device 102 and the compressed size 208' is updated as compressed data is written to a new storage device block address 206' for an I/O request number 202'/host LBA 204'.

FIG. 3a illustrates a free space list entry $300_i$ in the free space list 300 including a number of free blocks 302, indicating a number of one or more free consecutive storage device block addresses at each of the storage device block addresses 304 listed in the entry $300_i$ for the number of free blocks 302. One of the storage device block addresses 304 may be used to determine the number of free blocks 302 that are available to write compressed data. In one embodiment the number of entries $300_i$ in the free space list 300 may be equal to the total number of blocks in a host I/O request. For instance, if there are 8 blocks in a host read or write request, then there are eight entries in the free space list 300 for 1 through 8 number of blocks that are free consecutive blocks. The field 304 may indicate one or more storage device block address or a null value indicating there is no storage device block address in the storage device 102 at which there are free consecutive blocks equal to the corresponding number of free blocks 302 in the entry $300_i$.

FIG. 3b illustrates an example of a free space list 300' having eight entries for eight possible numbers of free blocks 302' for an eight block I/O request size, and a list of storage device block address 304' at which there are the corresponding number of free blocks 302'. The free space list 300' is updated as storage device blocks are freed and added to the free space list 300 and used and removed from the list 300' for new I/O requests.

FIG. 3C illustrates an example of the layout of a storage media 132', where areas showing a range of blocks labeled as $D_{Li}$ comprise a region of data for an I/O request number Li, where the size of the range storing data for an I/O request number Li has a variable number of storage device blocks based on the compression ratio experienced for data stored at I/O request number Li. The grey areas between data ranges $D_{Li}$ represent free space areas whose storage device block numbers are indicated in the free space list 300'. For instance, the address mapping 200' shows that the first I/O request number 0 is three compressed blocks starting at storage device block 0. FIG. 3c shows the data for the I/O request number as $D_{L0}$ consuming three storage device blocks 0, 1, and 2. The second row of the free space list 300' shows that there are two free blocks at storage device block address 3, and this is illustrated in FIG. 3C with the greyed out area shown for storage device blocks 3 and 4.

Figure 4:
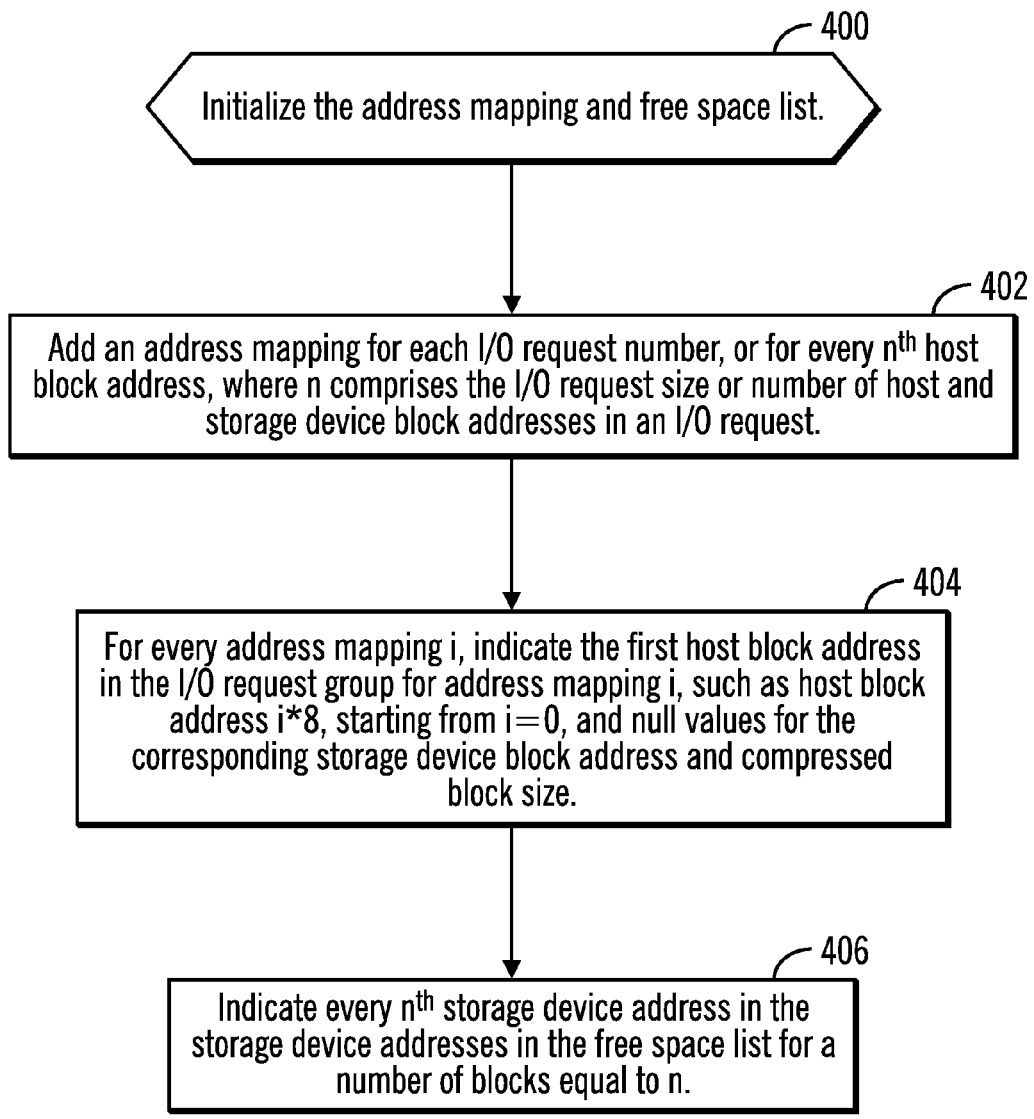
FIG. 4 illustrates an embodiment of operations to initialize the address mappings and the free space list.

FIG. 4 illustrates an embodiment of operations performed by the compression manager 118 to initialize the address mappings 200 and the free space list 300. Upon initiating (at block 400) the initialization operations, an address mapping $200_i$ is added (at block 402) for each I/O request number (each host block address that may be the subject of an I/O request) or for every nth host block address, where n is the I/O request size or number of host block addresses in an I/O request. For every address mapping i, the compression manager 118 indicates (at block 404) the first host block address 204 in the I/O request for address mapping i, such as host block address i*8, starting from i=0, and null values for the corresponding storage device block address 206 and compressed block size 208. Every nth storage device block address starting from 0, e.g., 0, 8, 16, 24, . . . , is indicated (at block 406) in the storage devices addresses 304 in the free space list entry $300_n$ for the entry for the I/O request size, or the entry having the number of free blocks 302 equal to n.

In an embodiment where the host block address 204 is not explicitly listed, only the null values are indicated for the storage device block address 206 and the compressed block size 208.

With the embodiment of FIG. 4, the initial address mappings 200 have sequential numbers for I/O request numbers and are associated with host block addresses (explicit in field 204 or implicit by I/O request number 202) that is every nth host block address, because there are n host block addresses in each I/O block group. The storage device addresses 304 in the free space list entries may be ordered in ascending order so that earlier storage device addresses are selected first to use for a write request.

Figure 5A:
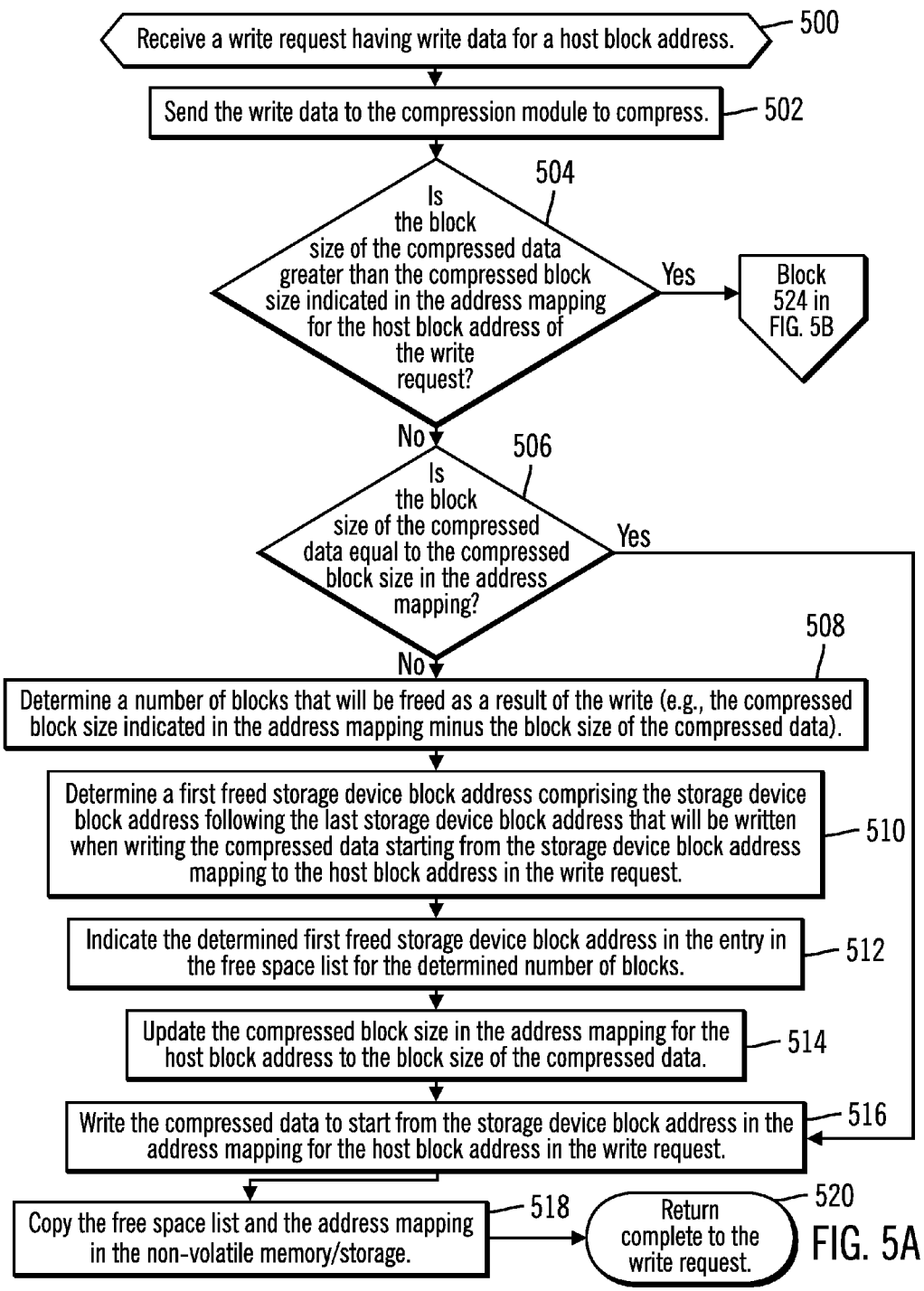
FIGS. 5a and 5b illustrate an embodiment of operations to compress data to write to a storage device.
Figure 5B:
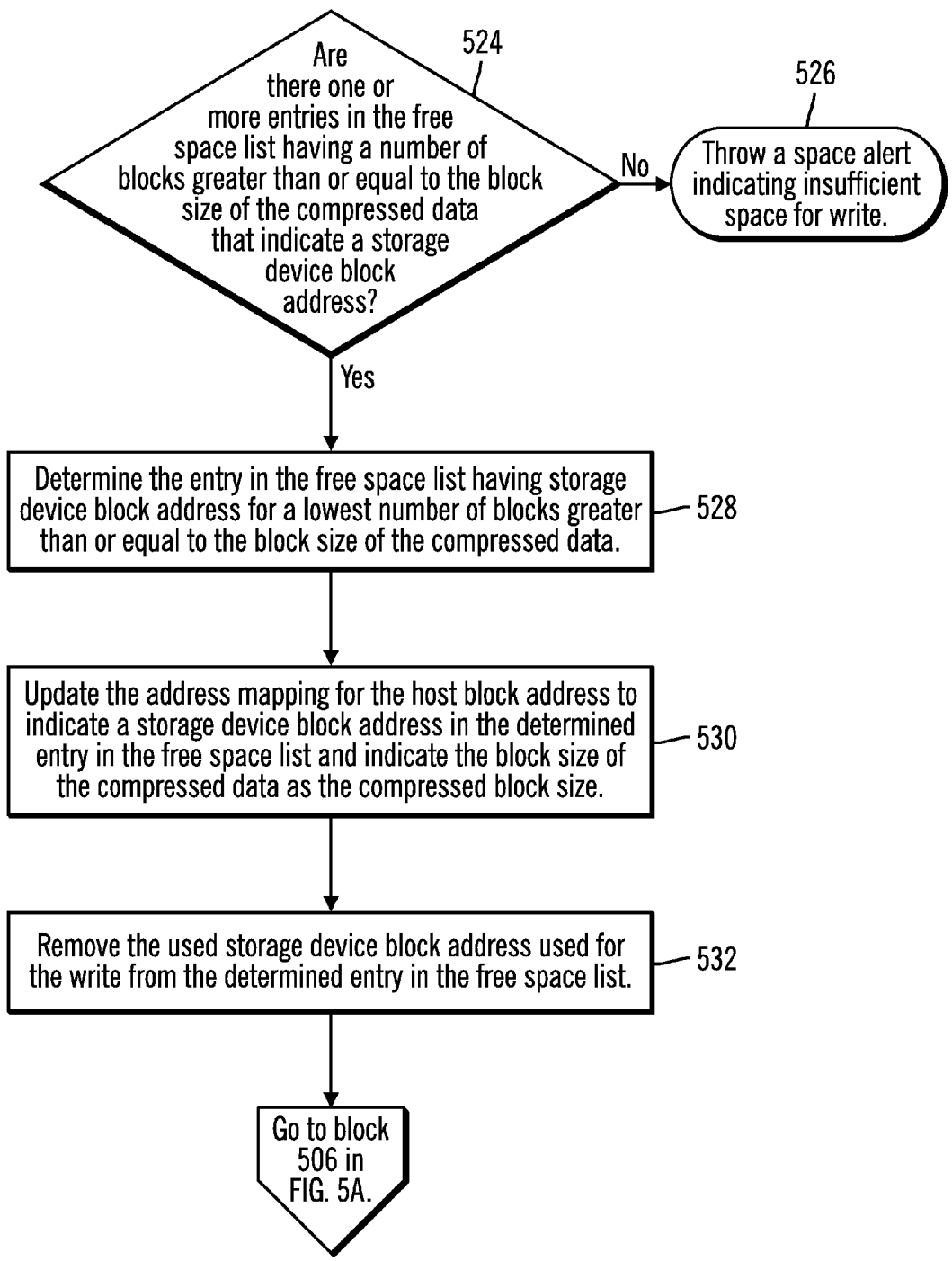

FIGS. 5a and 5b illustrate an embodiment of operations performed by the I/O manager 116 and compression manager 118, or other components, to process a write request directed to a host block address, e.g., host LBA, for a block size of n. Upon receiving (at block 500) the write request, the compression manager 118 sends (at block 502) the write data to the compression module 126 to compress. If (at block 504) the block size of the returned compressed data is not greater than the compressed block size 208 indicated in the address mapping $200_i$ for the host block address of the write request, then a determination is made (at block 506) whether the block size of the compressed data is equal to the compressed block size 208 in the address mapping $200_i$. In described embodiments, the block size of the compressed data is greater than a compressed block size 208 of null, which is set when the compressed block size for the host block address is initialized.

If (at block 506) the block size of the returned compressed data is not equal to the compressed block size 208 in the address mapping $200_i$, then the compression manager 118 determines (at block 508) a number of blocks that will be freed as a result of the new write data for the host block address having a greater compression ratio and requiring fewer blocks, which may be determined as the compressed block size 208 indicated in the address mapping $200_i$ minus the block size of the returned compressed data. The compression manager 118 determines (at block 510) a first freed storage device block address comprising the storage device block address following the last storage device block address that will be written when writing the compressed data starting from the storage device block address 206 mapping to the host block address in the write request. The first freed storage device block address is indicated (at block 512) in the entry $300_i$ in the free space list for the determined number of blocks that will be freed, indicating that these freed storage device blocks are now available for use. The compressed block size 208 in the address mapping $200_i$ for the host block address for the write request is updated (at block 514) to the block size of the compressed data. From block 514 after updating the free space list 300 or if the block size of the compressed data is the same as the compressed block size 208 indicated in the address mapping $200_i$ for the host block address, then the I/O manager 116 may write (at block 516) the compressed data to start from the storage device block address 206 in the address mapping entry for the host block address in the write request without having to update the free space list 300 because there are no freed blocks resulting from the write.

After the address mapping 200 and free space list 300 are updated, the compression manager 118 may copy (at block 518) both the address mapping 200 and free space list 300 to the non-volatile memory 124 for persistent storage, so that the address mapping 200 and free space list 300 are available even while the computer system 100 is reset or experiences a power loss. Complete may then be returned (at block 520) to the write request from the host operating system 112.

If (at block 504) the block size of the returned compressed data is greater than the compressed block size 208 of the data stored at the host block address subject to the write request, then control proceeds to block 524 in FIG. 5b where the compression manager 118 determines whether there is a storage device block address 304 in the free space list 300 in the entry for a number of free blocks 302 greater than or equal to the block size of the compressed data, i.e., is there enough free space of consecutive blocks to store the compressed data. If (at block 524) there is no storage device block address from which there is sufficient free space for the compressed data, then the compression manager 118 throws (at block 526) a space alert indicating insufficient free space for the write. If (at block 524) the free space list 300 has one or more entries $300_i$ having a number of free blocks 302 greater than or equal to the block size of the compressed data that indicate a storage device block address 304, then the compression manager 118 determines (at block 528) the entry $300_i$ in the free space list having a storage device block address for a lowest number of free blocks 302 that is greater than or equal to the block size of the compressed data. In this way the smallest number of free consecutive storage device block addresses sufficient to store the compressed data is selected. The address mapping $200_i$ for the host block address being written is updated (at block 530) to indicate a selected storage device block address in the determined free space list entry $300_i$ in the host block address field 204 and indicate the block size of the returned compressed data in the compressed block size 208 of the address mapping $200_i$. In certain embodiments, the storage device block addresses 304 in the entries $300_i$ may be ordered in ascending order, and the lowest or first listed storage device block address is selected to use for the compressed data.

The storage device block address used for the compressed data is removed (at block 532) from the determined entry $300_i$ in the free space list 300. Control then proceeds to block 506 to write the compressed data to the selected storage device block address and determine whether the selected storage device block addresses for the compressed data from the free space list 300 need to be split if the selected storage device block addresses from the free space list exceed the block size of the compressed data.

With the described operations of FIGS. 5a and 5b, the compression manager 118 may dynamically adjust the block size of data written to the storage device when the number of blocks needed to store write data for a request block size varies based on the compression ratio experienced for the data. In this way, if fewer blocks than a full request block size is needed for compressed data at a host block address, then the storage device block addresses following the storage device blocks addresses needed for the compressed data within the block request size may be indicated as free and available to store compressed data for another host block address. This allows for all unused storage device block addresses to be used for writes to different host block addresses.

Figure 6:
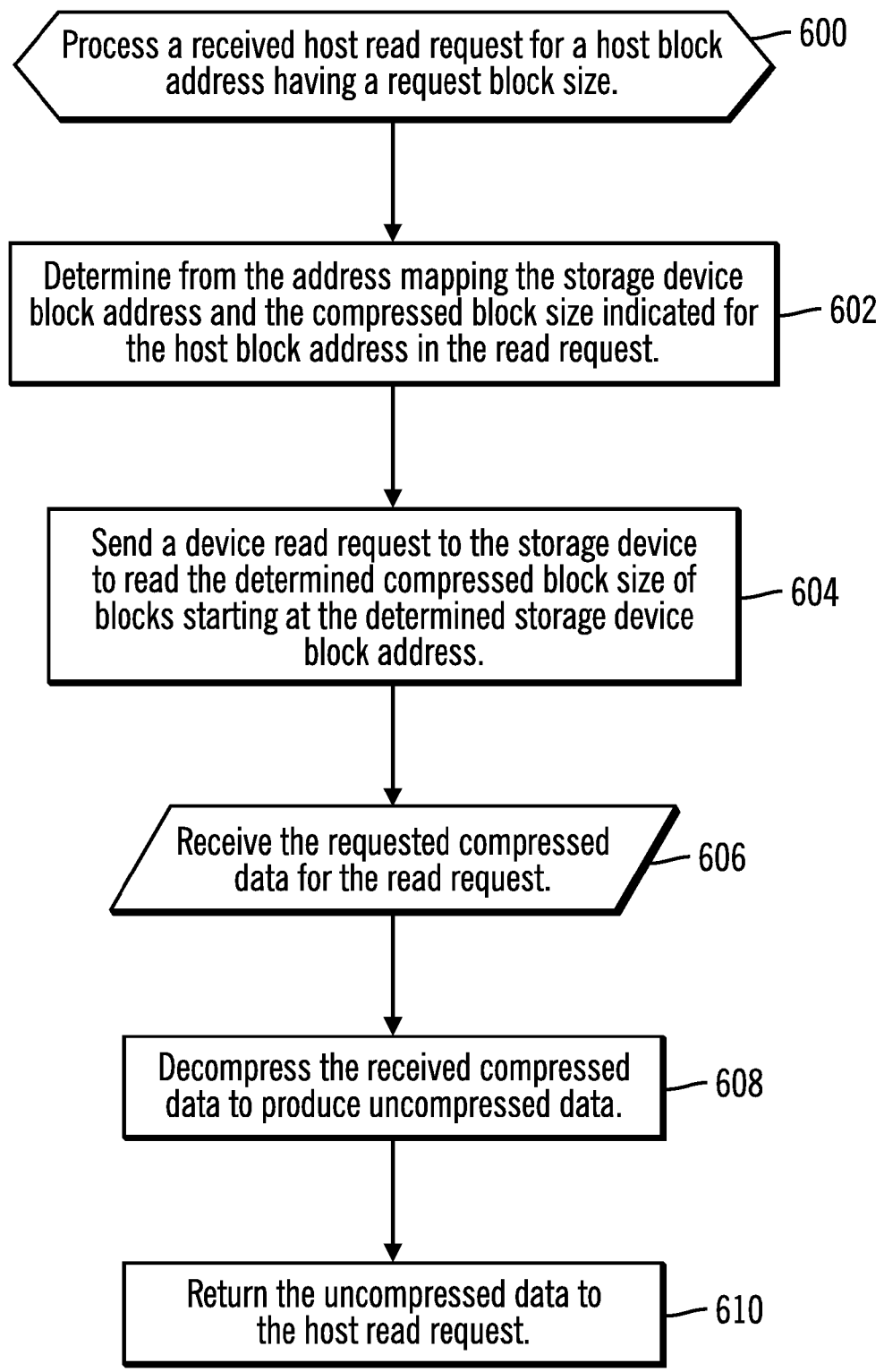
FIG. 6 illustrates an embodiment of operations to read compressed data from the storage device.

FIG. 6 illustrates an embodiment of operations performed by the I/O manager 116 and compression manager 118 to process a read request received at the I/O manager 116 for a request size directed to a host block address, e.g., host LBA, for a block size of n. Upon receiving (at block 600) at the I/O manager 116 a host read request for a host block address of the request block size, the I/O manager 116 determines (at block 602) from the address mapping $200_i$ for the host block address in the read request the storage device block address 206 and the compressed block size 208 indicated for the host block address 204 in the read request. The I/O manager 116 sends (at block 604) a device read request to the storage device 102 to read the determined compressed block size 208 of blocks starting at the determined storage device block address 206.

Upon receiving (at block 606) the requested compressed data for the read request, the I/O manager 116 may send the compressed data to the compression manager 118, which sends to the compression module 126 to decompress (at block 608) the received compressed data. The I/O manager 116 returns (at block 610) the uncompressed data to the host operating system 112 in response to the read request. The uncompressed data is the size of the I/O request size, e.g., n blocks, such as 8.

Figure 7:
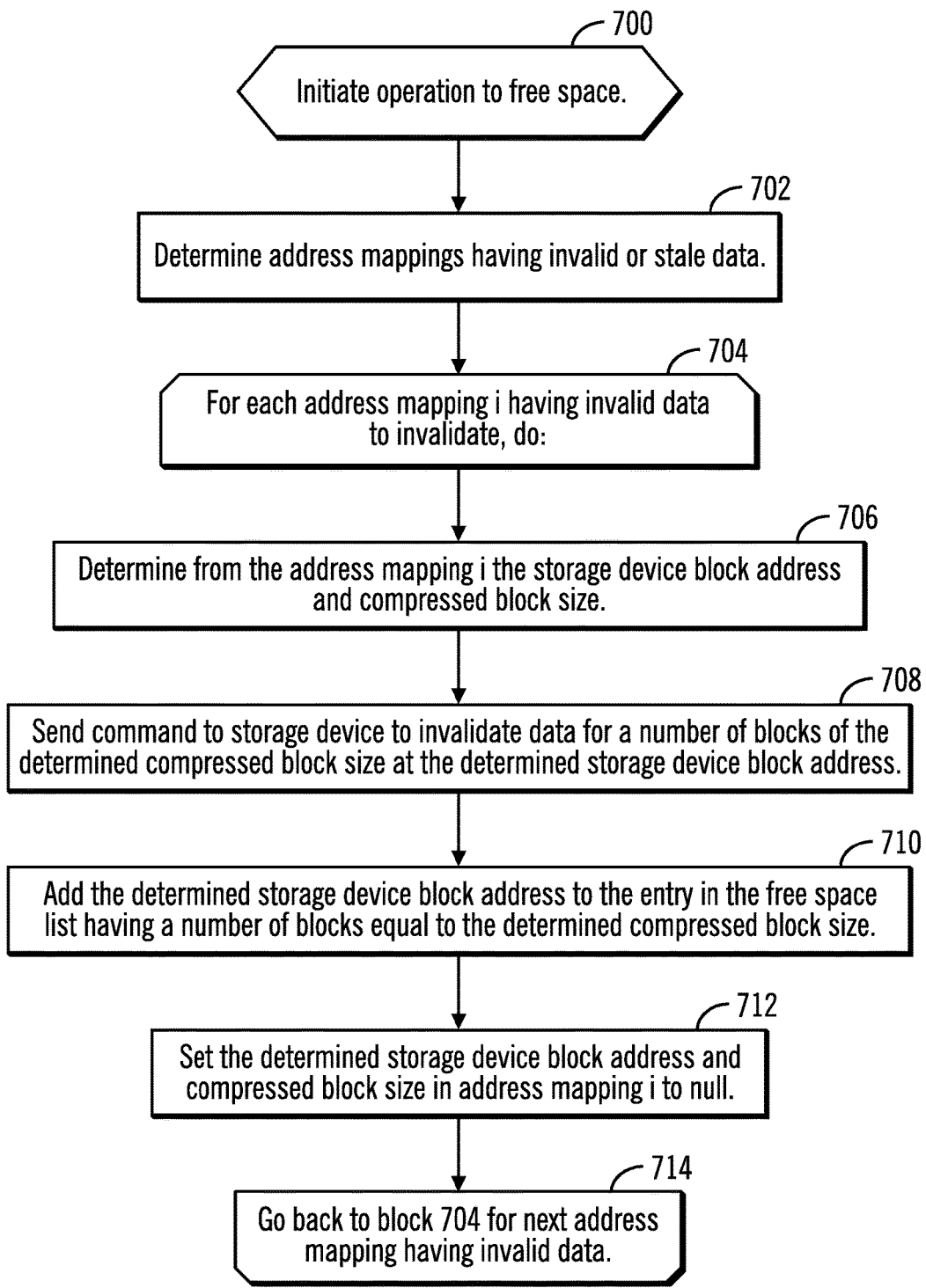
FIG. 7 illustrates an embodiment of operations to free space in the storage device.

FIG. 7 illustrates an embodiment of performed by the compression manager 118 or other component in the storage driver 114 to free storage device block addresses in the storage device 102 having invalid data. This operation may be performed if free space falls below a threshold, in response to a space deficiency alert, such as at block 526 in FIG. 5b or as part of a defragmentation operation. Upon initiating (at block 700) the operation to free or trim space, the compression manager 118 determines (at block 702) the address mappings 200 having invalid or stale data, which may be indicated in the address mappings 200 or other metadata for the data. For each address mapping $200_i$ having invalid data to invalidate, which may comprise some or all of the address mappings 200 having invalid or stale data, a loop of operations is performed at blocks 704-714.

The storage device block address 206 and the compressed block size 208 in the address mapping $200_i$ are determined (at block 706). The compression manager 118 may send (at block 708) a command to the storage device 102 to invalidate data for a number of blocks of the determined compressed block size 208 at the determined storage device block address 206. The determined storage device block address 206 is added (at block 710) to the $300_i$ entry in the free space list 300 having a number of free blocks 302 equal to the determined compressed block size 208, and the storage device block address 206 and the compressed block size 208 in the address mapping $200_i$ are set (at block 712) to null.

Figure 8:
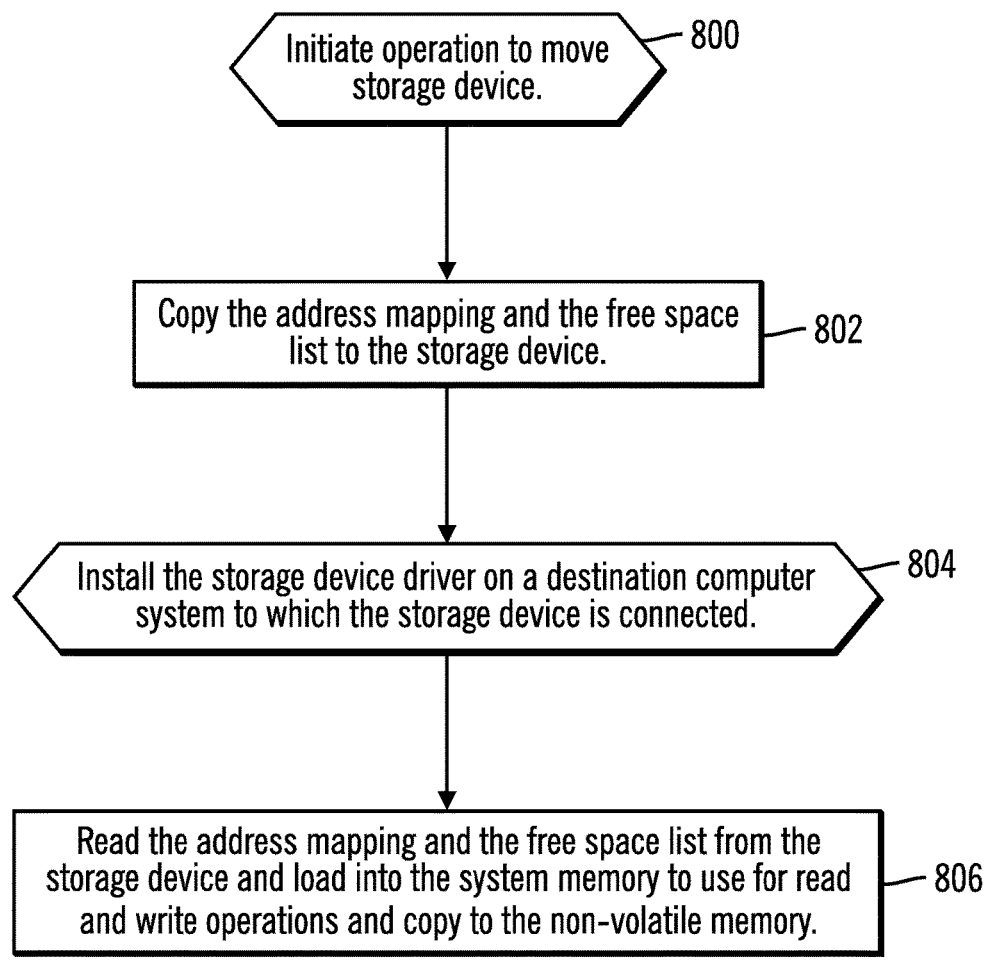
FIG. 8 illustrates an embodiment of operations to move the storage device to a destination computer system.

FIG. 8 illustrates an embodiment of operations performed by the migration manager 120 to allow the data stored in storage device 102 that is accessible from the source computer system $100_S$ to be accessible from a destination computer system $100_D$. Upon initiating (at block 800) an operation to move the storage device 102 to the destination computer system $100_D$, which may be initiated through the user selecting migration from a user interface generated by the storage driver 114, the migration manager 120 copies (at block 802) the address mapping 200 and the free space list 300 to the storage device 102, which may be stored at a predefined location in the storage device 102 reserved for the address mapping 200 and free space list 300. Upon installing (at block 804) the storage driver 114 on the destination computer system $102_D$ to which the storage device 102 is now connected, the migration manager 120 as part of the installation reads (at block 806) the address mapping 200 and free space list 300 from the storage device 102 and then loads the read address mapping 200 and free space list 300 into the system memory 108 and the non-volatile memory 124 of the destination computer system $100_D$. The loaded address mapping 200 and free space list 300 may then be used by the storage driver 114 to read and write data to the storage device 102 at the destination computer system $100_D$.

Described embodiments provide techniques to read and write compressed data in a storage device by performing the compression and decompression operations in a computer system coupled to the storage device. Described embodiments have the computer system maintain address mappings, each indicating a storage device block address for a host block address and a compressed block size indicating a number of blocks storing compressed data for data written to the host block address starting at the storage device block address. Write data for a write request to a host block address is compressed. The address mapping for the host block address in the write request is updated to indicate a storage device address at which the compressed data is stored in the storage device and a block size of the compressed data as the compressed block size. The compressed data is sent to the storage device to write at the storage device block address.

Figure 9:
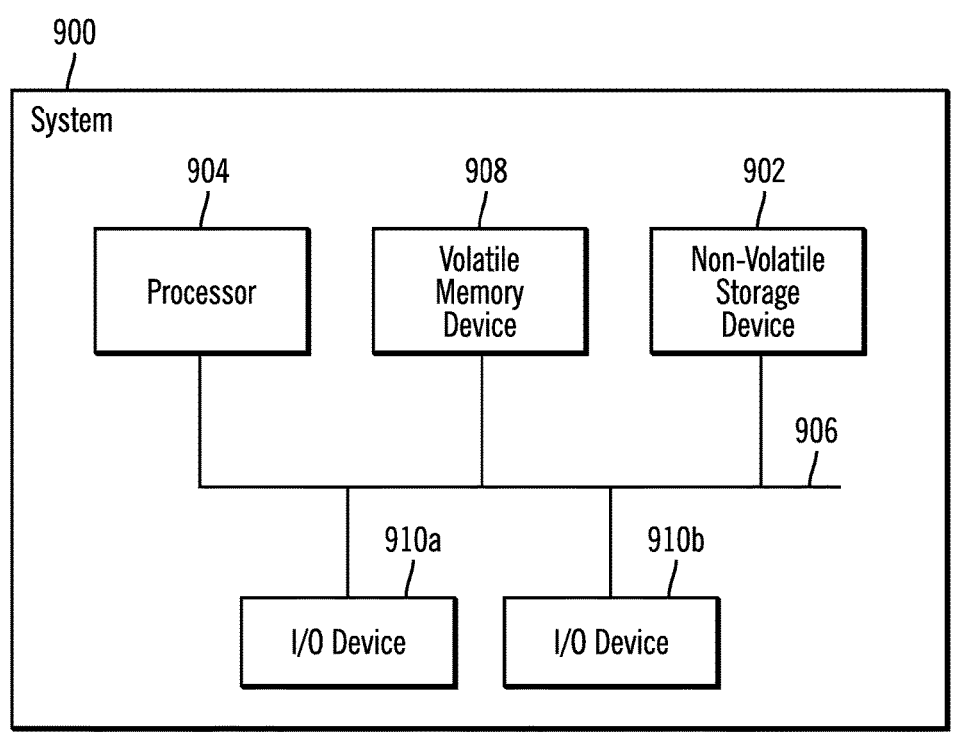
FIG. 9 illustrates an embodiment in which the computer system and storage device of FIG. 1 may be deployed.

FIG. 9 illustrates an embodiment of a computer system 900 implementation, such as for the computer system 100, including a non-volatile storage device 902, such as storage device 102 of FIG. 1. The system 900 includes a processor 904 that communicates over a bus 906 with a volatile memory device 908, such as system memory 108, in which programs, operands and parameters, such as operating system 112, applications 110, and storage driver 114, being executed are loaded. The processor 904 may also communicate with Input/Output (I/O) devices 910a, 910b, which may comprise input devices, display devices, graphics cards, ports, network interfaces, etc. The non-volatile storage device 902 may be mounted to the system 900 enclosure, such as in a storage drive bay, or connected to the system 900 through a port interface or over the network.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of embodiments of the invention, various features are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claimed subject matter requires more features than are expressly recited in each claim. Rather, as the following claims reflect, inventive aspects lie in less than all features of a single foregoing disclosed embodiment. Thus, the claims following the detailed description are hereby expressly incorporated into this detailed description.

The described operations of the storage driver 114, including the I/O manager 116, compression manager 118, and migration manager 120, and other components, may be implemented as a method, apparatus, device, article of manufacture, and/or computer program product comprising a computer readable storage medium using standard programming and/or engineering techniques to produce software, firmware, hardware, or any combination thereof. The computer readable storage medium includes a tangible element, including at least one of electronic circuitry, storage materials, inorganic materials, organic materials, biological materials, a casing, a housing, a coating, and hardware. A computer readable storage medium may comprise, but is not limited to, a magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), Solid State Devices (SSD), ferroelectric random-access memory (FeTRAM), nanowire-based non-volatile memory, three-dimensional (3D) crosspoint memory, phase change memory (PCM), memory that incorporates memristor technology, Magnetoresistive random-access memory (MRAM), Spin Transfer Torque (STT)-MRAM, computer encoded and readable punch cards, etc. The computer readable storage medium may further comprise microcode or firmware implemented in a hardware device (e.g., an integrated circuit chip, a programmable logic device, a Programmable Gate Array (PGA), field-programmable gate array (FPGA), Application Specific Integrated Circuit (ASIC), etc.). Still further, the code implementing the described operations may be implemented in "transmission signals", where transmission signals may propagate through space or through a transmission media, such as an optical fiber, copper wire, etc. The transmission signals in which the code or logic is encoded may further comprise a wireless signal, satellite transmission, radio waves, infrared signals, Bluetooth, etc. The program code embedded on a computer readable storage medium may be transmitted as transmission signals from a transmitting station or computer to a receiving station or computer. A computer readable storage medium, as that term is used herein, is not comprised solely of transmission signals, but includes physical and tangible components.

Examples

The following examples pertain to further embodiments.

Example 1 is a computer program product including a computer readable storage media deployed in a computer system connected to a storage device, wherein the computer readable storage media includes computer program code executed to increase a capacity of a storage device and to: maintain address mappings, each addressing mapping of the address mappings to indicate a storage device block address for a host block address and a compressed block size to indicate a number of blocks storing compressed data for data written to the host block address starting at the storage device block address; compress write data for a write request to a host block address to produce compressed data, wherein a block size of the compressed data is less than request block size of the write data for the write request; indicate in the address mapping for the host block address a storage device address at which to start storing the compressed data in the storage device and the compressed block size; and send the compressed data to the storage device to write at the storage device block address.

In Example 2, the subject matter of Examples 1 and 3-12 can optionally include that the computer program code is further executed to: receive a host read request to read data at a host block address having the request block size; determine, from the address mapping for the host block address of the host read request, the storage device block address and the compressed block size indicated for the host block address; and send a storage device read request to the storage device to read the compressed data starting at the storage device block address for the compressed block size.

In Example 3, the subject matter of Examples 1, 2 and 4-12 can optionally include that the computer program code is further executed to: determine whether the block size of the compressed data is less than a current compressed block size indicated in the address mapping for current compressed data stored at the storage device block address for the host block address in the write request, wherein the current compressed data was written before the write request; and in response to the block size of the compressed data for the write request being less than the current compressed block size indicated in the address mapping: determine at least one freed storage device block address that will be freed as a result of writing the compressed data for the write request to the storage device block address in the address mapping; and indicate the at least one storage device block address that will be freed in a free space list indicating free consecutive storage device block addresses.

In Example 4, the subject matter of Examples 1-3 and 5-12 can optionally include that the determined at least one freed storage device block address comprises at least one storage device block address sequentially following the current compressed data written at the storage device block address in the address mapping for the host block address of the write request, and wherein a block size of the at least one freed storage device block address comprises the current compressed block size less the block size of the compressed data in the write request.

In Example 5, the subject matter of Examples 1-4 and 6-12 can optionally include that the computer program code is further executed to: in response to the block size of the compressed data for the write request being greater than the current compressed block size indicated in the address mapping: determine, from the free space list, free consecutive storage device block addresses at least the block size of the compressed data, wherein the storage device block address indicated in the address mapping comprises one of the determined free consecutive storage device block addresses; and remove indication of the determined free consecutive storage device block addresses to which the compressed data is written from the free space list.

In Example 6, the subject matter of Examples 1-5 and 7-12 can optionally include that the computer program code is further executed to: indicate in a free space list storage device block addresses freed as a result of writing the compressed data at the storage device block address indicated in the address mapping when the block size of the compressed data is fewer blocks than a current compressed block data size indicated in the address mapping for the host block address before the write request.

In Example 7, the subject matter of Examples 1-6 and 8-12 can optionally include that the computer program code is further executed to: determine from a free space list free consecutive storage device block addresses comprising the block size of the compressed data when the block size of the compressed data is greater than a current compressed block size indicated in the address mapping for the host block address before the write request, wherein the storage device block address indicated in the address mapping comprises a first of the determined free consecutive storage device block addresses.

In Example 8, the subject matter of Examples 1-7 and 9-12 can optionally include that the free space list has a plurality of entries, wherein each of the entries indicates a number of free blocks and zero or more storage device block address from which there are consecutive of the number of free blocks for the entry.

In Example 9, the subject matter of Examples 1-8 and 10-12 can optionally include that the host block addresses comprise host logical block addresses and wherein the storage device block addresses comprise storage device logical block addresses which are mapped to physical block addresses within the storage device.

In Example 10, the subject matter of Examples 1-9 and 11-12 can optionally include that the computer program code is further executed to: determine address mappings having invalid data to invalidate; for each of the determined address mappings: send a command to the storage device to invalidate a number of blocks of the compressed block size indicated in the address mapping at the storage device block address indicated in the address mapping; and set the storage device block address and the compressed block address in the address mapping to null.

In Example 11, the subject matter of Examples 1-10 and 12 can optionally include that the computer program code is deployed in a device driver program executing in a system memory interfacing between an operating system and the storage device, wherein the address mappings are stored in the system memory, and wherein the computer system is in communication with a non-volatile storage and a compression module that compresses and decompresses the data, wherein the computer program code is further executed to: copy the address mappings to the non-volatile storage, wherein the system memory and the non-volatile storage are implemented in separate physical devices.

In Example 12, the subject matter of Examples 1-11 can optionally include that the computer program code is further executed to: copy the address mapping to the storage device in response to an operation to move the storage device to a destination computer system; and in response to installing the device driver program in the destination computer system, read the address mapping from the storage device to store in a system memory of the destination computer system to use for read and write operations from the destination computer system to the storage device.

Example 13 is a system in communication with a storage device, comprising: a processor; and a computer readable storage media including computer program code executed by the processor to: maintain address mappings, each addressing mapping of the address mappings to indicate a storage device block address for a host block address and a compressed block size to indicate a number of blocks storing compressed data for data written to the host block address starting at the storage device block address; compress write data for a write request to a host block address to produce compressed data, wherein a block size of the compressed data is less than request block size of the write data for the write request; indicate in the address mapping for the host block address a storage device address at which to start storing the compressed data in the storage device and the compressed block size; and send the compressed data to the storage device to write at the storage device block address.

In Example 14, the subject matter of Examples 13 and 15-19 can optionally include that the computer program code is further executed to: determine whether the block size of the compressed data is less than a current compressed block size indicated in the address mapping for current compressed data stored at the storage device block address for the host block address in the write request, wherein the current compressed data was written before the write request; and in response to the block size of the compressed data for the write request being less than the current compressed block size indicated in the address mapping: determine at least one freed storage device block address that will be freed as a result of writing the compressed data for the write request to the storage device block address in the address mapping; and indicate the at least one storage device block address that will be freed in a free space list indicating free consecutive storage device block addresses.

In Example 15, the subject matter of Examples 13, 14 and 16-19 can optionally include that the computer program code is further executed to: in response to the block size of the compressed data for the write request being greater than the current compressed block size indicated in the address mapping: determine, from the free space list, free consecutive storage device block addresses at least the block size of the compressed data, wherein the storage device block address indicated in the address mapping comprises one of the determined free consecutive storage device block addresses; and remove indication of the determined free consecutive storage device block addresses to which the compressed data is written from the free space list.

In Example 16, the subject matter of Examples 13-15 and 17-19 can optionally include that the computer program code is further executed to: indicate in a free space list storage device block addresses freed as a result of writing the compressed data at the storage device block address indicated in the address mapping when the block size of the compressed data is fewer blocks than a current compressed block data size indicated in the address mapping for the host block address before the write request.

In Example 17, the subject matter of Examples 13-16 and 18-19 can optionally include that the computer program code is further executed to: determine from a free space list free consecutive storage device block addresses comprising the block size of the compressed data when the block size of the compressed data is greater than a current compressed block size indicated in the address mapping for the host block address before the write request, wherein the storage device block address indicated in the address mapping comprises a first of the determined free consecutive storage device block addresses.

In Example 18, the subject matter of Examples 13-17 and 19 can optionally include that the computer program code is further executed to: determine address mappings having invalid data to invalidate; for each of the determined address mappings: send a command to the storage device to invalidate a number of blocks of the compressed block size indicated in the address mapping at the storage device block address indicated in the address mapping; and set the storage device block address and the compressed block address in the address mapping to null.

In Example 19, the subject matter of Examples 13-18 can optionally include that the computer program code is deployed in a device driver program interfacing between an operating system and the storage device, further comprising: a non-volatile storage; and a compression module that compresses and decompresses the data for the device driver program, wherein the computer program code is further executed to copy the address mappings from the compute readable storage medium to the non-volatile storage, wherein the system memory and the non-volatile storage are implemented in separate physical devices.

Example 20 is a method to increase capacity of a storage device comprising: maintaining address mappings, each addressing mapping of the address mappings indicating a storage device block address for a host block address and a compressed block size indicating a number of blocks storing compressed data for data written to the host block address starting at the storage device block address; compressing write data for a write request to a host block address to produce compressed data, wherein a block size of the compressed data is less than request block size of the write data for the write request; indicating in the address mapping for the host block address a storage device address at which to start storing the compressed data in the storage device and the compressed block size; and sending the compressed data to the storage device to write at the storage device block address.

In Example 21, the subject matter of Examples 20 and 22-25 can optionally include determining whether the block size of the compressed data is less than a current compressed block size indicated in the address mapping for current compressed data stored at the storage device block address for the host block address in the write request, wherein the current compressed data was written before the write request; and in response to the block size of the compressed data for the write request being less than the current compressed block size indicated in the address mapping: determining at least one freed storage device block address that will be freed as a result of writing the compressed data for the write request to the storage device block address in the address mapping; and indicating the at least one storage device block address that will be freed in a free space list indicating free consecutive storage device block addresses.

In Example 22, the subject matter of Examples 20, 21 and 23-25 can optionally include in response to the block size of the compressed data for the write request being greater than the current compressed block size indicated in the address mapping: determining, from the free space list, free consecutive storage device block addresses at least the block size of the compressed data, wherein the storage device block address indicated in the address mapping comprises one of the determined free consecutive storage device block addresses; and removing indication of the determined free consecutive storage device block addresses to which the compressed data is written from the free space list.

In Example 23, the subject matter of Examples 20-22 and 24-25 can optionally include indicating in a free space list storage device block addresses freed as a result of writing the compressed data at the storage device block address indicated in the address mapping when the block size of the compressed data is fewer blocks than a current compressed block data size indicated in the address mapping for the host block address before the write request.

In Example 24, the subject matter of Examples 20-24 and 25 can optionally include determining address mappings having invalid data to invalidate; for each of the determined address mappings: sending a command to the storage device to invalidate a number of blocks of the compressed block size indicated in the address mapping at the storage device block address indicated in the address mapping; and setting the storage device block address and the compressed block address in the address mapping to null.

In Example 25, the subject matter of Examples 20-25 can optionally include copying the address mappings from the system memory to a non-volatile storage, wherein the system memory and the non-volatile storage are implemented in separate physical devices.

In Example 26, the subject matter of Example 20 can optionally include at least any one of:
(1) receiving a host read request to read data at a host block address having the request block size; determining, from the address mapping for the host block address of the host read request, the storage device block address and the compressed block size indicated for the host block address; and sending a storage device read request to the storage device to read the compressed data starting at the storage device block address for the compressed block size; and/or (2) determining whether the block size of the compressed data is less than a current compressed block size indicated in the address mapping for current compressed data stored at the storage device block address for the host block address in the write request, wherein the current compressed data was written before the write request; and in response to the block size of the compressed data for the write request being less than the current compressed block size indicated in the address mapping: determining at least one freed storage device block address that will be freed as a result of writing the compressed data for the write request to the storage device block address in the address mapping; and indicating the at least one storage device block address that will be freed in a free space list indicating free consecutive storage device block addresses; and/or (3) wherein the determined at least one freed storage device block address comprises at least one storage device block address sequentially following the current compressed data written at the storage device block address in the address mapping for the host block address of the write request, and wherein a block size of the at least one freed storage device block address comprises the current compressed block size less the block size of the compressed data in the write request; and/or (4) in response to the block size of the compressed data for the write request being greater than the current compressed block size indicated in the address mapping: determining, from the free space list, free consecutive storage device block addresses at least the block size of the compressed data, wherein the storage device block address indicated in the address mapping comprises one of the determined free consecutive storage device block addresses; and removing indication of the determined free consecutive storage device block addresses to which the compressed data is written from the free space list; and/or (5) indicating in a free space list storage device block addresses freed as a result of writing the compressed data at the storage device block address indicated in the address mapping when the block size of the compressed data is fewer blocks than a current compressed block data size indicated in the address mapping for the host block address before the write request; and/or (6) determining from a free space list free consecutive storage device block addresses comprising the block size of the compressed data when the block size of the compressed data is greater than a current compressed block size indicated in the address mapping for the host block address before the write request, wherein the storage device block address indicated in the address mapping comprises a first of the determined free consecutive storage device block addresses; and/or (7) wherein the free space list has a plurality of entries, wherein each of the entries indicates a number of free blocks and zero or more storage device block address from which there are consecutive of the number of free blocks for the entry; and/or (8) wherein the host block addresses comprise host logical block addresses and wherein the storage device block addresses comprise storage device logical block addresses which are mapped to physical block addresses within the storage device.

(9) determining address mappings having invalid data to invalidate; for each of the determined address mappings: send a command to the storage device to invalidate a number of blocks of the compressed block size indicated in the address mapping at the storage device block address indicated in the address mapping; and set the storage device block address and the compressed block address in the address mapping to null; and/or

(10) wherein the method is deployed in a device driver program executing in a system memory interfacing between an operating system and the storage device, wherein the address mappings are stored in the system memory, and wherein the computer system is in communication with a non-volatile storage and a compression module that compresses and decompresses the data, further comprising: copy the address mappings to the non-volatile storage, wherein the system memory and the non-volatile storage are implemented in separate physical devices; and/or

(11) copying the address mapping to the storage device in response to an operation to move the storage device to a destination computer system; and in response to installing the device driver program in the destination computer system, reading the address mapping from the storage device to store in a system memory of the destination computer system to use for read and write operations from the destination computer system to the storage device.

Example 27 is an apparatus to increase capacity of a storage device comprising: means for maintaining address mappings, each addressing mapping of the address mappings indicating a storage device block address for a host block address and a compressed block size indicating a number of blocks storing compressed data for data written to the host block address starting at the storage device block address; means for compressing write data for a write request to a host block address to produce compressed data, wherein a block size of the compressed data is less than request block size of the write data for the write request; means for indicating in the address mapping for the host block address a storage device address at which to start storing the compressed data in the storage device and the compressed block size; and means for sending the compressed data to the storage device to write at the storage device block address.

Example 28 is an apparatus having computer program code executed to communicate with a memory device, increase a capacity of a storage device and to: maintain address mappings in the memory device, each addressing mapping of the address mappings to indicate a storage device block address for a host block address and a compressed block size to indicate a number of blocks storing compressed data for data written to the host block address starting at the storage device block address; compress write data for a write request to a host block address to produce compressed data, wherein a block size of the compressed data is less than request block size of the write data for the write request; indicate in the address mapping for the host block address a storage device address at which to start storing the compressed data in the storage device and the compressed block size; and send the compressed data to the storage device to write at the storage device block address.

In Example 29, the subject matter of Examples 28 and 30-39 can optionally include receive a host read request to read data at a host block address having the request block size; determine, from the address mapping for the host block address of the host read request, the storage device block address and the compressed block size indicated for the host block address; and send a storage device read request to the storage device to read the compressed data starting at the storage device block address for the compressed block size.

In Example 30, the subject matter of Examples 28, 29 and 31-39 can optionally include determine whether the block size of the compressed data is less than a current compressed block size indicated in the address mapping for current compressed data stored at the storage device block address for the host block address in the write request, wherein the current compressed data was written before the write request; and in response to the block size of the compressed data for the write request being less than the current compressed block size indicated in the address mapping: determine at least one freed storage device block address that will be freed as a result of writing the compressed data for the write request to the storage device block address in the address mapping; and indicate the at least one storage device block address that will be freed in a free space list indicating free consecutive storage device block addresses.

In Example 31, the subject matter of Examples 28-30 and 32-39 can optionally include that the determined at least one freed storage device block address comprises at least one storage device block address sequentially following the current compressed data written at the storage device block address in the address mapping for the host block address of the write request, and wherein a block size of the at least one freed storage device block address comprises the current compressed block size less the block size of the compressed data in the write request.

In Example 32, the subject matter of Examples 28-31 and 33 in response to the block size of the compressed data for the write request being greater than the current compressed block size indicated in the address mapping: determine, from the free space list, free consecutive storage device block addresses at least the block size of the compressed data, wherein the storage device block address indicated in the address mapping comprises one of the determined free consecutive storage device block addresses; and remove indication of the determined free consecutive storage device block addresses to which the compressed data is written from the free space list.

In Example 33, the subject matter of Examples 28-32 and 34-39 can optionally include indicate in a free space list storage device block addresses freed as a result of writing the compressed data at the storage device block address indicated in the address mapping when the block size of the compressed data is fewer blocks than a current compressed block data size indicated in the address mapping for the host block address before the write request.

In Example 34, the subject matter of Examples 28-33 and 35-39 can optionally include determine from a free space list free consecutive storage device block addresses comprising the block size of the compressed data when the block size of the compressed data is greater than a current compressed block size indicated in the address mapping for the host block address before the write request, wherein the storage device block address indicated in the address mapping comprises a first of the determined free consecutive storage device block addresses.

In Example 35, the subject matter of Examples 28-34 and 36-39 can optionally include that the free space list has a plurality of entries, wherein each of the entries indicates a number of free blocks and zero or more storage device block address from which there are consecutive of the number of free blocks for the entry.

In Example 36, the subject matter of Examples 28-35 and 37-39 can optionally include that the host block addresses comprise host logical block addresses and wherein the storage device block addresses comprise storage device logical block addresses which are mapped to physical block addresses within the storage device.

In Example 37, the subject matter of Examples 28-36 and 38-39 can optionally include determine address mappings having invalid data to invalidate; for each of the determined address mappings: send a command to the storage device to invalidate a number of blocks of the compressed block size indicated in the address mapping at the storage device block address indicated in the address mapping; and set the storage device block address and the compressed block address in the address mapping to null.

In Example 38, the subject matter of Examples 28-37 and 39 can optionally include that the apparatus is deployed in a device driver program executing in a system memory interfacing between an operating system and the storage device, wherein the address mappings are stored in the system memory, and wherein the computer system is in communication with a non-volatile storage and a compression module that compresses and decompresses the data, wherein the computer program code is further executed to: copy the address mappings to the non-volatile storage, wherein the system memory and the non-volatile storage are implemented in separate physical devices.

In Example 39, the subject matter of Examples 28-38 can optionally include copy the address mapping to the storage device in response to an operation to move the storage device to a destination computer system; and in response to installing the device driver program in the destination computer system, read the address mapping from the storage device to store in a system memory of the destination computer system to use for read and write operations from the destination computer system to the storage device.

Example 40 is an apparatus comprising means to perform a method as claimed in any preceding claim.

Example 41 is a machine-readable storage including machine-readable instructions, when executed, to implement a method or realize an apparatus as claimed in any preceding claim.

What is claimed:

1. A computer program product including a computer readable storage media deployed in a computer system connected to a storage device, wherein the computer readable storage media includes computer program code executed to compress data to store in a storage device and to:
    maintain address mappings, each addressing mapping of the address mappings to indicate a storage device block address for a host block address and a compressed block size to indicate a number of blocks storing compressed data for data written to the host block address starting at the storage device block address;
    compress write data for a write request to a host block address to produce compressed write data, wherein a compressed write data block size of a number of blocks storing the compressed write data is less than a request block size of the write data for the write request;
    indicate, in an address mapping for the host block address of the write request, a storage device block address at which to start storing the compressed write data in the storage device and the compressed write data block size; and
    send the compressed write data to the storage device to write at the storage device block address indicated in the address mapping for the host block address of the write request.

2. The computer program product of claim 1, wherein the computer program code is further executed to:

receive a host read request to read data at a host block address having the request block size;

determine, from an address mapping for the host block address of the host read request, a storage device block address and a compressed block size indicated for the host block address of the host read request; and send a storage device read request to the storage device to read compressed data starting at the storage device block address for the compressed block size indicated in the address mapping for the host block address of the host read request.

3. The computer program product of claim 1, wherein the computer program code is further executed to:

determine whether the compressed write data block size is less than a current compressed block size for current compressed data stored at the storage device block address indicated in the address mapping for the host block address in the write request, wherein the current compressed data was written before the write request; and in response to the compressed write data block size being less than the current compressed block size:
  determine at least one freed storage device block address that will be freed as a result of writing the compressed write data for the write request to the storage device block address in the address mapping for the host block address of the write request; and
  indicate the determined at least one freed storage device block address that will be freed in a free space list indicating free consecutive storage device block addresses.

4. The computer program product of claim 3, wherein the determined at least one freed storage device block address comprises at least one storage device block address sequentially following the current compressed data written at the storage device block address in the address mapping for the host block address of the write request, and wherein a block size of the at least one freed storage device block address comprises the current compressed block size less the compressed write data block size.

5. The computer program product of claim 3, wherein the computer program code is further executed to:

in response to the compressed write data block size being greater than the current compressed block size indicated:
  determine, from the free space list, free consecutive storage device block addresses at least the compressed write data block size, wherein the storage device block address indicated in the address mapping for the host block address of the write request comprises one of the determined free consecutive storage device block addresses; and
  remove indication of the determined free consecutive storage device block addresses to which the compressed data is written from the free space list.

6. The computer program product of claim 1, wherein the computer program code is further executed to:

indicate, in a free space list, storage device block addresses freed as a result of writing the compressed write data at the storage device block address indicated in the address mapping for the host block address of the write request when the compressed write data block size is fewer blocks than a current compressed block data size indicated in the address mapping for the host block address of the write request before the write request.

7. The computer program product of claim 1, wherein the computer program code is further executed to:

determine, from a free space list, free consecutive storage device block addresses comprising the compressed write data block size when the compressed write data block size is greater than a current compressed block size indicated in the address mapping for the host block address of the write request before the write request, wherein the storage device block address indicated in the address mapping for the host block address of the write request comprises a first of the determined free consecutive storage device block addresses.

8. The computer program product of claim 7, wherein the free space list has a plurality of entries, wherein each of the entries indicates a number of free blocks and zero or more storage device block address from which there are consecutive of the number of free blocks for the entry.

9. The computer program product of claim 1, wherein host block addresses comprise host logical block addresses and wherein storage device block addresses comprise storage device logical block addresses which are mapped to physical block addresses within the storage device.

10. The computer program product of claim 1, wherein the computer program code is further executed to:

determine address mappings having invalid data to invalidate;

for each address mapping of the determined address mappings:
  send a command to the storage device to invalidate a number of blocks of the compressed block size indicated in the address mapping at the storage device block address indicated in the address mapping; and
  set the storage device block address and the compressed block size in the address mapping to null.

11. The computer program product of claim 1, wherein the computer program code is deployed in a device driver program executing in a system memory interfacing between an operating system and the storage device, wherein the address mappings are stored in the system memory, and wherein the computer system is in communication with a non-volatile storage and a compression module that compresses and decompresses the data, wherein the computer program code is further executed to:

copy the address mappings to the non-volatile storage, wherein the system memory and the non-volatile storage are implemented in separate physical devices.

12. The computer program product of claim 11, wherein the computer program code is further executed to:

copy the address mappings to the storage device in response to an operation to move the storage device to a destination computer system; and in response to installing the device driver program in the destination computer system, read the address mappings from the storage device to store in a system memory of the destination computer system to use for read and write operations from the destination computer system to the storage device.

13. A system in communication with a storage device, comprising:

a processor; and a computer readable storage media including computer program code executed by the processor to:

maintain address mappings, each addressing mapping of the address mappings to indicate a storage device block address for a host block address and a compressed block size to indicate a number of blocks storing compressed data for data written to the host block address starting at the storage device block address;

compress write data for a write request to a host block address to produce compressed write data, wherein a compressed write data block size of a number of blocks storing the compressed write data is less than request block size of the write data for the write request;

indicate in an address mapping for the host block address a storage device block address at which to start storing the compressed write data in the storage device and the compressed write data block size; and send the compressed write data to the storage device to write at the storage device block address indicated in the address mapping for the host block address of the write request.

14. The system of claim 13, wherein the computer program code is further executed to:

determine whether the compressed write data block size is less than a current compressed block size for current compressed data stored at the storage device block address indicated in the address mapping for the host block address in the write request, wherein the current compressed data was written before the write request; and in response to the compressed write data block size being less than the current compressed block size:

determine at least one freed storage device block address that will be freed as a result of writing the compressed write data for the write request to the storage device block address in the address mapping for the host block address of the write request; and indicate the determined at least one freed storage device block address that will be freed in a free space list indicating free consecutive storage device block addresses.

15. The system of claim 14, wherein the computer program code is further executed to:

in response to the compressed write data block size being greater than the current compressed block size:

determine, from the free space list, free consecutive storage device block addresses at least the compressed write data block size, wherein the storage device block address indicated in the address mapping for the host block address of the write request comprises one of the determined free consecutive storage device block addresses; and remove indication of the determined free consecutive storage device block addresses to which the compressed data is written from the free space list.

16. The system of claim 13, wherein the computer program code is further executed to:

indicate in a free space list storage device block addresses freed as a result of writing the compressed write data at the storage device block address indicated in the address mapping for the host block address of the write request when the compressed write data block size is fewer blocks than a current compressed block data size indicated in the address mapping for the host block address of the write request before the write request.

17. The system of claim 13, wherein the computer program code is further executed to:

determine from a free space list free consecutive storage device block addresses comprising the compressed write data block size when the compressed write data block size is greater than a current compressed block size indicated in the address mapping for the host block address of the write request before the write request, wherein the storage device block address indicated in the address mapping for the host block address of the write request comprises a first of the determined free consecutive storage device block addresses.

18. The system of claim 13, wherein the computer program code is further executed to:

determine address mappings having invalid data to invalidate;

for each address mapping of the determined address mappings:

send a command to the storage device to invalidate a number of blocks of the compressed block size indicated in the address mapping at the storage device block address indicated in the address mapping; and set the storage device block address and the compressed block size in the address mapping to null.

19. The system of claim 13, wherein the computer program code is deployed in a device driver program in a system memory interfacing between an operating system and the storage device, further comprising:

a non-volatile storage; and a compression module that compresses and decompresses the data for the device driver program, wherein the computer program code is further executed to copy the address mappings from the compute readable storage media to the non-volatile storage, wherein the system memory and the non-volatile storage are implemented in separate physical devices.

20. A method to compress data to store in a storage device comprising:

maintaining address mappings, each addressing mapping of the address mappings indicating a storage device block address for a host block address and a compressed block size indicating a number of blocks storing compressed data for data written to the host block address starting at the storage device block address;

compressing write data for a write request to a host block address to produce compressed write data, wherein a compressed write data block size of a number of blocks storing the compressed write data is less than a request block size of the write data for the write request;

indicating in an address mapping for the host block address of the write request a storage device block address at which to start storing the compressed write data in the storage device and the compressed write data block size; and sending the compressed write data to the storage device to write at the storage device block address indicated in the address mapping for the host block address of the write request.

21. The method of claim 20, further comprising:

determining whether the compressed write data block size is less than a current compressed block size for current compressed data stored at the storage device block address indicated in the address mapping for the host block address in the write request, wherein the current compressed data was written before the write request; and in response to the compressed write data block size being less than the current compressed block size:

determining at least one freed storage device block address that will be freed as a result of writing the compressed write data for the write request to the storage device block address in the address mapping for the host block address of the write request; and indicating the determined at least one freed storage device block address that will be freed in a free space list indicating free consecutive storage device block addresses.

22. The method of claim 21, further comprising:

in response to the compressed write data block size being greater than the current compressed block size:

determining, from the free space list, free consecutive storage device block addresses at least the compressed write data block size wherein the storage device block address indicated in the address mapping for the host block address of the write request comprises one of the determined free consecutive storage device block addresses; and removing indication of the determined free consecutive storage device block addresses to which the compressed data is written from the free space list.

23. The method of claim 20, further comprising:

indicating in a free space list storage device block addresses freed as a result of writing the compressed write data at the storage device block address indicated in the address mapping for the host block address of the write request when the compressed write data block size is fewer blocks than a current compressed block data size indicated in the address mapping for the host block address of the write request before the write request.

24. The method of claim 20, further comprising:

determining address mappings having invalid data to invalidate;

for each address mapping of the determined address mappings:

sending a command to the storage device to invalidate a number of blocks of the compressed block size indicated in the address mapping at the storage device block address indicated in the address mapping; and setting the storage device block address and the compressed block size in the address mapping to null.

25. The method of claim 20, wherein the address mappings are stored in a system memory, further comprising:

copy the address mappings from the system memory to a non-volatile storage, wherein the system memory and the non-volatile storage are implemented in separate physical devices.

* * * * *